United States Patent
Bhatia et al.

(10) Patent No.: US 11,089,442 B2
(45) Date of Patent: Aug. 10, 2021

(54) SYSTEM AND METHOD FOR DYNAMICALLY SWITCHING EMBMS SERVICES

(71) Applicant: RELIANCE JIO INFOCOMM LIMITED, Maharashtra (IN)

(72) Inventors: Jitendra Bhatia, Maharashtra (IN); Pushan Puri, Maharashtra (IN)

(73) Assignee: RELIANCE JIO INFOCOMM LIMITED, Maharashtra (IN)

( * ) Notice: Subject to any disclaimer, the term of this patent is extended or adjusted under 35 U.S.C. 154(b) by 0 days.

(21) Appl. No.: 16/618,968

(22) PCT Filed: Jun. 21, 2018

(86) PCT No.: PCT/IB2018/054567
§ 371 (c)(1),
(2) Date: Dec. 3, 2019

(87) PCT Pub. No.: WO2018/235025
PCT Pub. Date: Dec. 27, 2018

(65) Prior Publication Data
US 2020/0169850 A1   May 28, 2020

(30) Foreign Application Priority Data
Jun. 22, 2017  (IN) .............................. 201721021908

(51) Int. Cl.
*H04W 4/06*   (2009.01)
*H04W 8/22*   (2009.01)
(Continued)

(52) U.S. Cl.
CPC ............... *H04W 4/06* (2013.01); *H04W 8/22* (2013.01); *H04W 64/00* (2013.01); *H04W 80/085* (2013.01)

(58) Field of Classification Search
CPC ........... H04W 4/06; H04W 4/08; H04W 4/10; H04W 64/00; H04W 80/085; H04W 8/22;
(Continued)

(56) References Cited

U.S. PATENT DOCUMENTS

| 8,576,806 B2 | 11/2013 | Malladi | |
| 2004/0001488 A1* | 1/2004 | Harri | H04N 21/4348 370/392 |

(Continued)

OTHER PUBLICATIONS

Indian Patent Office, PCT International Search Report, International Application No. PCT/IB2018/054567, dated Oct. 11, 2018, pp. 1-3.
(Continued)

*Primary Examiner* — Jean A Gelin
(74) *Attorney, Agent, or Firm* — Hunton Andrews Kurth LLP

(57) ABSTRACT

A system and method for dynamically switching from a first internet protocol to a second internet protocol for providing service to a user equipment, is disclosed. More particularly, the embodiments may disclose a method for dynamically switching from the first internet protocol to the second internet protocol, comprises steps of: generating a first positive response in an event the service is capable of being provided using the second internet protocol; generating a second positive response in an event the user equipment is capable of receiving the service using the second internet protocol; generating a third positive response in an event a real-time location of the user equipment is within a coverage area; and dynamically switching from the first internet protocol to the second internet protocol based on at least one of the first positive response, the second positive response and the third positive response.

8 Claims, 5 Drawing Sheets

(51) Int. Cl.
  *H04W 64/00* (2009.01)
  *H04W 80/08* (2009.01)
(58) Field of Classification Search
  CPC ......... H04L 61/00; H04L 63/00; H04L 65/00;
    H04L 69/18; H04L 69/167; H04L 69/168;
    H04L 69/169; H04L 29/06027; H04L
    29/12216; H04L 61/2007
  See application file for complete search history.

(56) References Cited

U.S. PATENT DOCUMENTS

| | | | | |
|---|---|---|---|---|
| 2005/0047437 | A1* | 3/2005 | Cho | H04M 7/006 |
| | | | | 370/466 |
| 2006/0002306 | A1* | 1/2006 | Brown | H04L 45/28 |
| | | | | 370/241 |
| 2008/0165706 | A1* | 7/2008 | Bozionek | H04M 7/006 |
| | | | | 370/259 |
| 2009/0191841 | A1* | 7/2009 | Edge | H04M 7/127 |
| | | | | 455/404.1 |
| 2009/0232019 | A1* | 9/2009 | Gupta | H04L 12/2876 |
| | | | | 370/252 |
| 2011/0067081 | A1* | 3/2011 | Strom | H04N 21/64322 |
| | | | | 725/110 |
| 2011/0153831 | A1* | 6/2011 | Mutnuru | H04L 69/167 |
| | | | | 709/226 |
| 2013/0039251 | A1 | 2/2013 | Wilkinson et al. | |
| 2014/0064177 | A1 | 3/2014 | Anchan | |
| 2014/0095668 | A1* | 4/2014 | Oyman | H04B 17/318 |
| | | | | 709/219 |
| 2014/0372624 | A1* | 12/2014 | Wang | H04L 69/18 |
| | | | | 709/231 |
| 2015/0043429 | A1* | 2/2015 | Kim | H04L 67/18 |
| | | | | 370/328 |
| 2017/0104717 | A1* | 4/2017 | Vesterinen | H04W 76/15 |
| 2019/0075046 | A1* | 3/2019 | Yu | H04L 61/1511 |

OTHER PUBLICATIONS

Indian Patent Office, PCT Written Opinion of the International Searching Authority, International Application No. PCT/IB2018/054567, dated Oct. 11, 2018, pp. 1-5.

* cited by examiner

SYSTEM AND METHOD FOR DYNAMICALLY SWITCHING EMBMS SERVICES

CROSS REFERENCE TO RELATED APPLICATIONS

This application is a U.S. national phase application under 35 U.S.C. § 371 of International Application No. PCT/IB2018/054567, filed on Jun. 21, 2018, which claims priority to Indian Patent Application No. 201721021908, filed on Jun. 22, 2017, the complete disclosures of which are incorporated herein by reference.

TECHNICAL FIELD

The present invention generally relates to communication systems. More particularly, the present invention relates to a system and method for dynamically switching service/s provided to a user equipment from one internet protocol to another.

BACKGROUND

With the advancement in the technology, a lot of services have been offered to mobile users. One such service provided to the mobile users is a multimedia streaming service. Further, mobile users are frequently demanding spontaneous access to live video content which is a higher-quality experience and more convergent mobile services than ever before.

The long-term evolution (hereinafter referred as LTE) broadcast using 3GPP evolved multimedia broadcast multicast services (hereinafter referred as eMBMS) technology enables mobile network operators to efficiently launch media services over the LTE to meet the existing demand for the media service. In particular, the LTE broadcast enables multiple users to simultaneously receive the same content and can simultaneously deliver the same content to multiple users with the capability to support a virtually unlimited number of users, thereby maintaining efficient use of spectrum and network investments. Currently, the LTE eMBMS service is being deployed by the mobile network operators around the world for providing television services on mobile devices and tablets on the go.

In the first version of LTE (release 8), only unicast (one to one) internet-protocol (hereinafter referred as IP) data was supported. Further, Release 9 introduced optional support of the eMBMS that is capable of providing support of multicast and broadcast (one to many) to the LTE networks. The eMBMS is also capable of supporting multimedia streaming applications as well as file downloading. As in all multicast system, the goal is to save bandwidth. For instance, if ten users request the same video program stream with unicast, the data will be transmitted ten times by transmitting the data separately to each user. However, with the eMBMS, the data will be broadcasted/multi-casted to the ten users simultaneously and thus, such data is transmitted only once.

Additionally, the eMBMS may also be used to multicast protected content on native or over-the-top (OTT) applications stored on a mobile device. For example, purchased data such as a commercial movie file to be played on the applications. Further, such content is encrypted over the air and a mobile user is authenticated to ensure that only authorized users can access the content on the application stored on the mobile device.

As discussed above, the capability of the eMBMS to transmit the same content to the multiple mobile users simultaneously, has emerged as a technology leap for broadcasting solution on the mobile devices resulting in serving more number of concurrent mobile users to watch the video live.

Moreover, the dynamic adaptive streaming over HTTP (DASH) industry forum interoperability report provides a basic architecture for supporting broadcast over the eMBMS but this architecture provides a very rudimentary architecture for unicast to broadcast and vice versa by adding much complexity at the backend system. As per 3GPP specifications TR 26.849 and TS 26.346, the DASH report proposes complex architecture from unicast to broadcast switching which makes the eMBMS complex & tedious. This architecture has delayed the commercial roll out in the market as the current architecture is not efficient and effective in handling the traffic both at unicast and multicast. Also, few other non-patent literature prior arts indicate that the LTE broadcast network, based on unicast to broadcast switch, leads to very complex system which requires to monitor each and every mobile user's stream and analyzing data in real time. Further, enablement of the eMBMS broadcast service dynamically leads to impractical situation for commercialising the eMBMS based video delivery to very large geography and to millions of mobile users having different sets of the mobile devices. However, in the special events such as live sports (like cricket) streaming, where millions of people are already expected to come simultaneously and watch the live video streaming, it becomes easier for operators to optimize the channel delivery solutions. Furthermore, in the existing scenario, when the large number of mobile users are concurrently watching the same channel, few challenges exist which must be addressed. Some of those challenges includes: enhancement of content delivery network (CDN) capacity if the mobile users are getting unicast video delivery, capability of the mobile devices to handle the eMBMS broadcast live stream, and the configuration of more than one or two channels for the eMBMS video delivery because of spectrum availability for broadcast and unicast in the current network.

In addition to above drawbacks, there is no provisions to use both channels of unicast and broadcast using eMBMS in the existing scenario which saves the bandwidth and optimize the delivery. Further, there also does not exist any solution to co-deploy both the unicast and broadcast for a dynamic eMBMS deployment. In such a situation, there is a necessity to evolve mechanisms or solutions where both the unicast and broadcast can be co-deployed.

Therefore, in view of above-mentioned drawbacks in the existing solutions, there is a need for an efficient and effective approach for optimizing the streaming of the content using both unicast and broadcast with the eMBMS in order to save bandwidth and optimize the content delivery.

SUMMARY

This section is provided to introduce certain aspects of the present invention in a simplified form that are further described below in the detailed description. This summary is not intended to identify the key features or the scope of the claimed subject matter.

Embodiments of the present invention may relate to a method for dynamically switching from a first internet protocol to a second internet protocol for providing at least one service to at least one user equipment, the method comprising: receiving a request from the at least one user equipment for availing the at least one service; providing the at least one service to the at least one user equipment, wherein the at least one service is provided using the first internet protocol; determining if the at least one service is capable of being provided using the second internet protocol; generating a first positive response and a first negative response, wherein the first positive response is generated in an event the at least one service is capable of being provided using the second internet protocol, and the first negative response is generated in an event the at least one service is incapable of being provided using the second internet protocol; generating a second positive response and a second negative response, wherein the second positive response is generated in an event the at least one user equipment is capable of receiving the at least one service using the second internet protocol, and the second negative response is generated in an event the at least one user equipment is incapable of receiving the at least one service using the second internet protocol; generating a third positive response and a third negative response, wherein the third positive response is generated in an event a real-time location of the at least one user equipment is within at least one coverage area, and the third negative response is generated in an event the real-time location of the at least one user equipment is out of the at least one coverage area; and dynamically switching from the first internet protocol to the second internet protocol for providing the at least one service to the at least one user equipment based on at least one of the first positive response, the second positive response and the third positive response.

Embodiments of the present invention may relate to a system for dynamically switching from a first internet protocol to a second internet protocol for providing at least one service to at least one user equipment, the system comprising: a transceiver configured to receive a request from the at least one user equipment for availing the at least one service; a service provider module configured to provide the at least one service to the at least one user equipment, wherein the at least one service is provided using the first internet protocol; a processing unit configured to determine if the at least one service is capable of being provided using the second internet protocol; a response generator module configured to: generate a first positive response and a first negative response, wherein the first positive response is generated in an event the at least one service is capable of being provided using the second internet protocol, and the first negative response is generated in an event the at least one service is incapable of being provided using the second internet protocol; generate a second positive response and a second negative response, wherein the second positive response is generated in an event the at least one user equipment is capable of receiving the at least one service using the second internet protocol, and the second negative response is generated in an event the at least one user equipment is incapable of receiving the at least one service using the second internet protocol; and generate a third positive response and a third negative response, wherein the third positive response is generated in an event a real-time location of the at least one user equipment is within at least one coverage area, and the third negative response is generated in an event the real-time location of the at least one user equipment is out of the at least one coverage area; and wherein the processing module further configured to dynamically switch from the first internet protocol to the second internet protocol for providing the at least one service to the at least one user equipment based on at least one of the first positive response, the second positive response and the third positive response.

BRIEF DESCRIPTION OF THE DRAWINGS

The accompanying drawings, which are incorporated herein, and constitute a part of this present invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Also, the embodiments shown in the figures are not to be construed as limiting the invention, but the possible variants of the method and system according to the invention are illustrated herein to highlight the advantages of the invention. It will be appreciated by those skilled in the art that disclosure of such drawings includes disclosure of electrical components or circuitry commonly used to implement such components.

DETAILED DESCRIPTION

Figure 1:
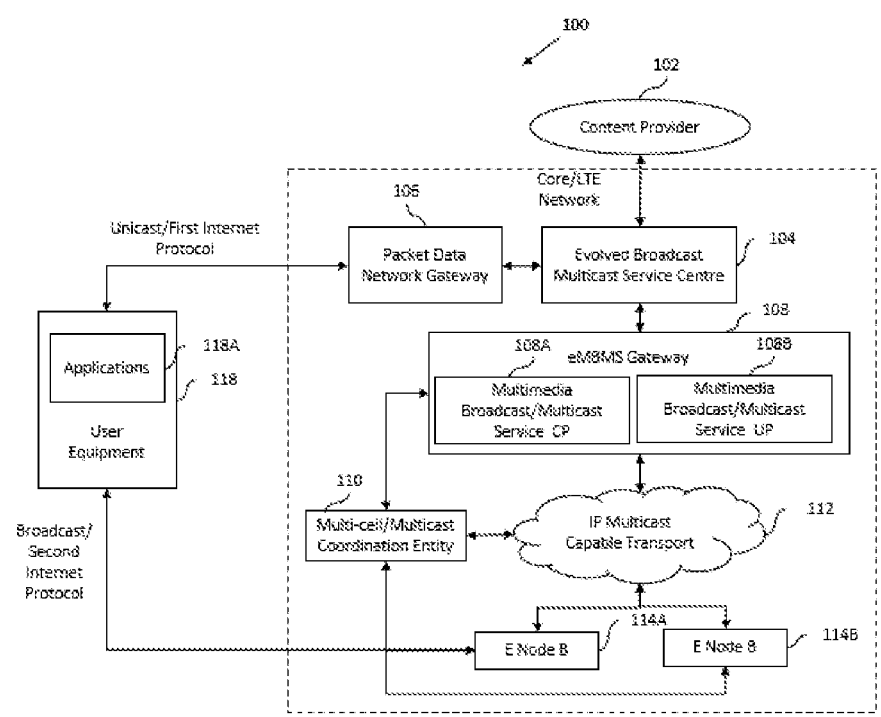
FIG. 1 illustrates an exemplary system architecture [100] for allowing access to service, in accordance with an embodiment of the present invention.

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present invention are described below, as illustrated in various drawings in which like reference numerals refer to the same parts throughout the different drawings.

The present invention encompasses a system and a method for dynamically switching from a first internet protocol to a second internet protocol for providing at least one service to at least one user equipment. In particular, the present invention encompasses a network and/or a single unified application capable to deliver the at least one service by automatically and dynamically switching the at least one service from the first internet protocol to the second internet protocol. Moreover, the unified application may be one of an over-the-top (hereinafter referred as OTT) application or a native application.

As used herein, the least one user equipment refers to at least one of an electrical device, an electronic device, an electromechanical device, and a combination of such devices. The user equipment may include, but not limited to, a mobile phone, a tablet, a wearable device, a phablet, a general-purpose computer, a desktop, a personal digital assistant, a mainframe computer, a personal digital assistance and any such device that is obvious to a person skilled in the art. In general, the user equipment is a digital, user configured, computer networked device that can operate autonomously.

As used herein, the native application or the OTT application refers to any application software that is pre-installed, or downloaded and installed, in the at least one user equipment. The native application or the OTT application include, but is not limited to, channels aggregation application, contact management application, video channel application, calendar application, messaging applications, image and/or video modification and viewing application, gaming application, navigational application, office application, business application, educational application, health and fitness application, medical application, financial application, social networking application, and any such application that is obvious to a person skilled in the art.

As used herein, the first internet protocol refers to a unicast internet protocol using which the at least one service is unicasted to the at least one user equipment.

As used herein, the second internet protocol refers to a broadcast internet protocol using which the at least one service is broadcasted to the at least one user equipment.

As used herein, the least one service refers to any evolved multimedia broadcast multicast service (eMBMS) that is provided to the at least one user equipment using at least one of the first internet protocol and the second internet protocol. Such service includes, but not limited to, a video streaming, a live video streaming, a live audio streaming, virtual reality (VR) streaming, a data streaming and an audio streaming.

As illustrated in FIG. 1, the present invention illustrates a system architecture [100] for allowing the access at least one service to at least one user equipment, in accordance with an embodiment of the present invention, wherein the architecture [100] encompasses a content provider [102], evolved broadcast multicast service centre [104] (hereinafter referred as eBMSC), packet data network gateway [106] (hereinafter referred as PGW), an evolved multimedia broadcast/multicast gateway [108] (including a multimedia broadcast/multicast service CP [108a] and a multimedia broadcast/multicast service UP [108b], hereinafter referred as eMBMS, a multi-cell/multicast coordination entity [110] (hereinafter referred as MCE), IP multicast capable transport [112], one or more E-node B [114A, 114B] and the at least one user equipment [118] storing one or more applications [118A].

The content provider [102] is configured to provide the content for the at least one service to the eBMSC [104]. The content provider [102] is further configured to relay live streams of the at the least one service towards a packager of the eBMSC [104] over the IP. The content provider [102] is also configured to incorporate one or more markers inside the live stream to identify advertisement markers. Additionally, the content provider [102] is capable of providing the high-resolution live stream towards the packager of the eBMSC [104], wherein the eBMSC [104] performs the video bit-rate transcoding as per the LTE broadcast spectrum.

The eBMSC [104] is configured to receive the content for the at least one service from the content provider [102] and further configured to transmit the content for the at least one service to the PGW [106]. The eBMSC [104] is also configured to authenticate and authorize the content provider [102]. The eBMSC [104] is also responsible for charging the end user and for the overall configuration of the data flow through a core/LTE network. In particular, the present invention encompasses the charging of the end user based on the consumption of the streams of the at least one service.

The PGW [106] is a router for the core/LTE network which routes the IP packets, wherein the packets may be unicast packets or multicast packets. The PGW [106] is configured to receive the content for the at least one service from the eBMSC [104]. Further, the PGW [106] is configured to transmit the at least one service to the at least one user equipment [118] using the first internet protocol. In a preferred embodiment, the first internet protocol is a unicast protocol.

The eMBMS gateway [108] may refer to a logical node handling the multicasting of IP packets from the eBMSC [104] to the one or more E-node B [114A, 114B]. The eMBMS gateway [108] is also configured to handle session control through mobile management entity (MME). The MME handles all tasks that are non-related to an air interface which means all non-access stratum (NAS) protocols are terminated in the MME. Further, the eMBMS gateway [108] includes the multimedia broadcast/multicast service CP (control plane—signalling traffic) [108a] and the multimedia broadcast/multicast service UP (user plane data traffic) [108b]. The MCE [110] may be a key element for the eMBMS gateway [108] in the LTE network. The MCE [110] is configured to coordinate the use of resources and transmission parameters across all radio cells/cell towers that belong to a multicast-broadcast single-frequency network (MBSFN) coverage area. In a preferred embodiment, the MCE is treated as a separate network element in the core/LTE network. Alternatively, the MCE may be deployed as a software in any of the components of the core/LTE network, preferably in the one or more E-node B [114A, 114B].

The IP multicast capable transport [112] is configured to carry the streams of the at least one service from one point to multiple points. The packager of the eBMSC [104] carries streams of the at least one service, creates chunks in MPEG DASH and transmits the MPEG DASH packets towards the eBMSC [104]. The eBMSC [104] carries the MPEG DASH packets in the payload of the multicast stream. Further, each of the router placed between eBMSC [104] and the one or more E-node B [114A, 114B] have the capability of the IP multicasting.

The one or more E-node B [114A, 114B] are configured to receive IP packets multi-casted from the eBMSC [104]. The one or more E-node B [114A, 114B] are configured to provide the at least one service to the one user equipment [118] using the second internet protocol. In a preferred embodiment, the second internet protocol is a broadcast protocol. Further, the one or more E-node B [114A, 114B] are configured to provide the LTE Signal towards the at least one user equipment [118].

The at least one user equipment [118] is configured to store the one or more applications [118A] in a memory, wherein such applications [118A] may be the native applications or the OTT applications. Further, the at least one service is provided to the at least one user equipment [118]

using the first internet protocol through the PGW [104]. Furthermore, the at least one service is provided to the at least one user equipment [118] using the second internet protocol through the one or more E-node B [114A, 114B]. Moreover, the one or more applications [118A] stored in the at least one user equipment [118] has the capability to provide the at least one service to the at least one user equipment [118] and dynamically switch from the first internet protocol to the second internet protocol for providing the at least one service to the at least one user equipment [118].

Figure 2:
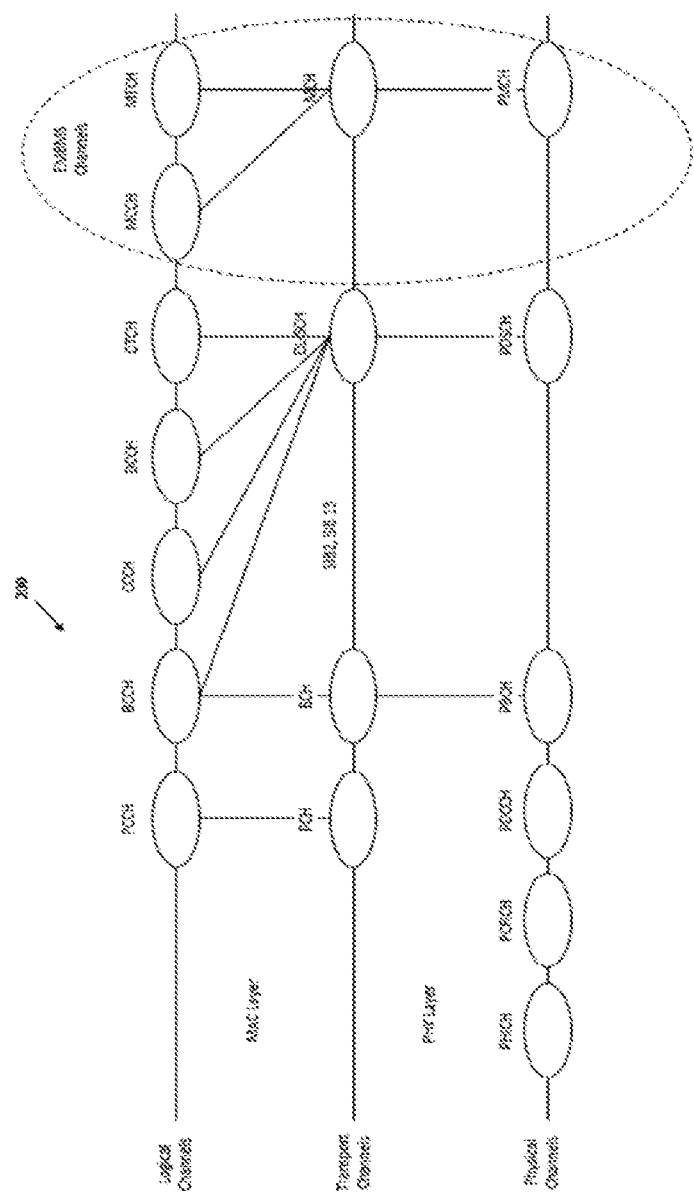
FIG. 2 illustrates an exemplary eMBMS channels [200] supported in LTE network, in accordance with an exemplary embodiment of the present invention.

As illustrated in FIG. 2, the present invention illustrates an exemplary eMBMS channels [200] supported in the LTE network, in accordance with an exemplary embodiment of the present invention. The support of eMBMS in the LTE network requires logical, transport and physical channels. Such channels in the LTE network are depicted in the FIG. 2.

As can be seen in the FIG. 2, there are two logical channels related to eMBMS i.e. multicast traffic channel (MTCH) and multicast control channel (MCCH). The MTCH carries data corresponding to the at least one service. The enormous number of services per MBSFN coverage area causes multiple MTCH. Such channel uses radio link control (RLC). Further, unacknowledged mode (UM) for data transmission is present as there is no feedback in the uplink from the at least one user equipment [118] in form of ACK/NACK due to the broadcast nature of the transmission. The MCCH provides necessary control information to receive the at least one service, including sub-frame allocation and modulation coding scheme (MCS).

One MCCH per MBSFN coverage area, as for the MTCH RLC UM, is used. Also, one or several MTCH and one MCCH are multiplexed at the medium access control (MAC) onto the multicast channel (MCH), which is further multiplexed to the physical multicast channel (PMCH). Also, no multiple antenna transmission (no MIMO) is defined for the PMCH. As the same data is transmitted by several radio cells/cell towers all belonging to one MBSFN coverage area, there is no dynamic adjustment of MCH resources by the one or more E-node B [114A, 114B]. The transport format is determined by the MCE [110] and signaled via the MCCH to the at least one user equipment [118].

Further, the MCCH defines always one MBSFN coverage area and carries just one single message i.e. MBSFNAreaConfiguration. This message provides all required information for scheduling the at least service which includes all PMCH belonging to that particular MBSFN coverage area and the configuration parameters for the session that are carried by the concerned PMCH. For an instance, there could be up to 15 PMCH, where each one has up to 29 sessions within the MTCH. For each PMCH there will be information which MBSFN sub-frames carries that PMCH (start, end) as well as the used modulation and coding scheme information. A common sub-frame allocation (CSA) period is first defined in number of radio frames. With that it can be determined how many sub-frames are available in total for eMBMS within a period, that can be used for PMCH and thus for MTCH.

In addition, the FIG. 2 depicts six physical channels: physical hybrid ARQ indicator channel (PHICH), physical control format indicator channel (PCFICH), physical downlink control channel (PDCCH), physical broadcast channel (PBCH), physical downlink shared channel (PDSCH), and PMCH. The PHICH provides feedback for uplink any transmission (ACK/NACK), the PCFICH provides resources used by the PDCCH, the PDCCH schedules information, the PBCH provides bandwidth, PHICH configuration and antennas, and the PDSCH provides user data, system as well as paging information. The PMCH channel is the eMBMS channel.

Figure 3:
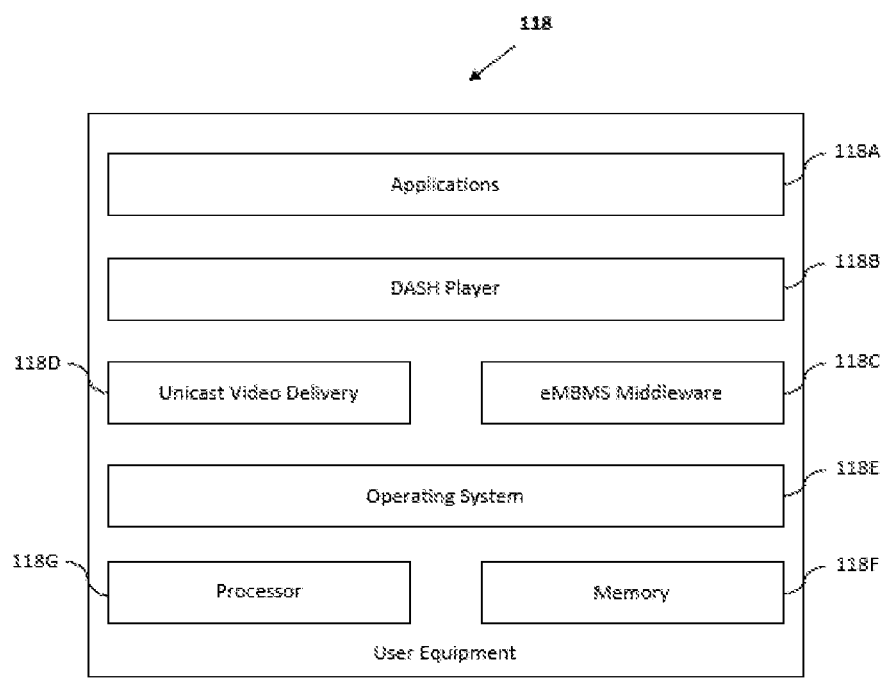
FIG. 3 illustrates an exemplary user equipment [118] for dynamically switching from a first internet protocol to a second internet protocol for providing service to user equipment [118], in accordance with an embodiment of the present invention.

As illustrated in FIG. 3, the present invention illustrates the at least one user equipment [118] for dynamically switching from the first internet protocol to the second internet protocol for providing the at least one service to the least one user equipment [118], in accordance with an embodiment of the present invention. The least one user equipment [118] is operated using an operating system [118E] stored in a memory [118F] of the at least one user equipment [118]. Such operating system [118E] is present in the form of a software and acts as an intermediator between hardware/s (such as processor [118G]) and other software/s (such as applications [118A]) stored in the at least one user equipment [118]. Further, the least one user equipment [118] stores the one or more applications [118A] in the memory [118F], wherein such applications may be the native applications or the OTT applications. Moreover, the one or more applications [118A] stored in the memory [118F] of the at least one user equipment [118] has the capability to dynamically switch from the first internet protocol to the second internet protocol for providing the at least one service to the at least one user equipment [118].

A DASH player [118B] present in the at least one user equipment [118] is configured to receive the unicast stream of the at least one service and support the MPEG-DASH protocol. Further, the DASH player [118B] is configured to decrypt, decode and render the at least one service at the at least one user equipment [118]. Moreover, the DASH player [118B] is capable to interpret the media presentation description (MPD) URL and playback the video stream of the at least one service. The Video MPD URL may be received from the content provider [102] or from any local server hosted on the at least one user equipment [118].

An eMBMS middleware video delivery [118C] present in the at least one user equipment [118] is configured to receive the at least one service using the second internet protocol through the one or more E-node B [114A, 114B]. The eMBMS middleware video delivery [118C] is also adapted to control an LTE Modem and tune to the at least one service using the second internet protocol for receiving the streams/packets of the at least one service. Further, the eMBMS middleware video delivery [118C] is configured to host the streams/packets of the at least one service in the local server on the at least one user equipment [118] and provide the MPEG DASH MPD URL towards the DASH player [118B] to playback the video stream of the at least one service.

A unicast video delivery [118D] present in the at least one user equipment [118] is configured to receive the at least one service using the first internet protocol through the PGW [104]. Further, the at least one service is received at the at least one user equipment [118] from the nearest content provider [102].

The processor [118G] may communicate with the each of the components of the at least one user equipment [118] and may be configured to perform operations by referring to the data stored in the memory [118F]. The processor [118G] as used herein may include, but is not limited to, a processor or set of processors such as a microprocessor, a multi-core microprocessor, a digital signal processor, a collection of electronic circuits, or a combination thereof and may be configured to perform operations/functions as described herein.

The memory [118F], coupled to the processor [118G], may be configured to store and manage multiple data/information. The memory [312] may include, but is not limited to, a volatile memory, non-volatile memory, a remote storage, a cloud storage, high-speed random-access memory and/or non-volatile memory, such as one or more magnetic disk storage devices, one or more optical storage devices, and/or flash memory (e.g., NAND, NOR) or a combination thereof.

Figure 4:
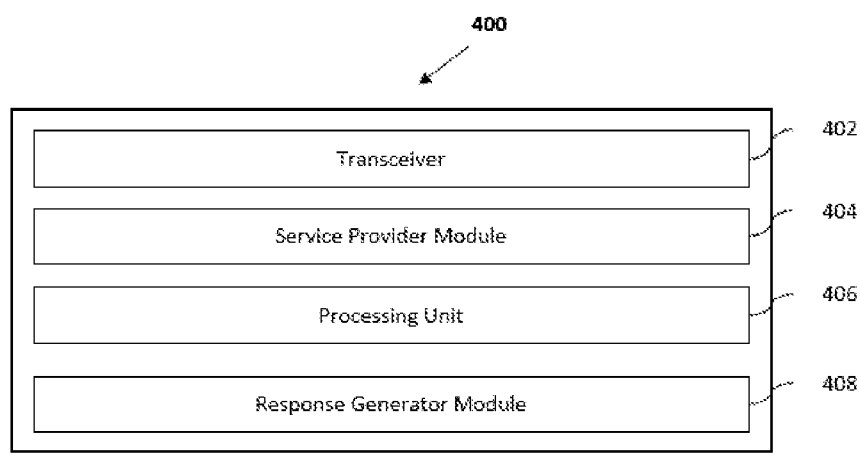
FIG. 4 illustrates exemplary system [400] having various components capable of dynamically switching from a first internet protocol to a second internet protocol for providing service to user equipment [118], in accordance with an embodiment of the present invention.

As illustrated in FIG. 4, the present invention illustrates exemplary system [400] having various components capable of dynamically switching from the first internet protocol to the second internet protocol for providing the at least one service to the at least one user equipment [118], in accordance with an embodiment of the present invention. Various components include: a transceiver [402], a service provider module [404], a processing unit [406] and a response generator module [408].

The transceiver [402] is configured to receive a request from the at least one user equipment [118] for availing the at least one service. In an embodiment, such request is transmitted from the at least one user equipment [118] when a user of the at least one user equipment [118] accesses the one or more applications [118A] to access the at least one service.

The service provider module [404] is configured to provide the at least one service to the at least one user equipment [118], wherein the at least one service is provided using the first internet protocol from the PGW [106]. The at least one service is provided to the at least one user equipment [118] pursuant to receiving the request from the at least one user equipment [118].

The processing unit [406] is configured to determine if the at least one service is capable of being provided using the second internet protocol. The processing unit [406] may communicate with the each of the components of the system [400]. The processing unit [406] as used herein may include, but is not limited to, a processor or set of processors such as a microprocessor, a multi-core microprocessor, a digital signal processor, a collection of electronic circuits, or a combination thereof and may be configured to perform operations/functions as described herein.

The response generator module [408] is configured to generate a first positive response and a first negative response, wherein the first positive response is generated in an event the at least one service is capable of being provided using the second internet protocol and the first negative response is generated in an event the at least one service is incapable of being provided using the second internet protocol. The response generator module [408] is also configured to generate a second positive response and a second negative response, wherein the second positive response is generated in an event the at least one user equipment [118] is capable of receiving the at least one service using the second internet protocol and the second negative response is generated in an event the at least one user equipment [118] is incapable of receiving the at least one service using the second internet protocol. Further, the response generator module [408] is also configured to generate a third positive response and a third negative response, wherein the third positive response is generated in an event a real-time location of the at least one user equipment [118] is within the MBSFN coverage area and the third negative response is generated in an event the real-time location of the at least one user equipment [118] is out of the MBSFN coverage area. Further, the MBSFN coverage area belongs to an area that provides the at least one service using the second internet protocol.

The processing unit [406] is further configured to dynamically switch from the first internet protocol to the second internet protocol for providing the at least one service to the at least one user equipment [118] based on at least one of the first positive response, the second positive response and the third positive response. Thereafter, the processing unit [406] provides the at least one service to the at least one user equipment [118] using the second internet protocol.

Such components as described hereinabove may be present in the at least one user equipment [118] or may be present in the one or more components of the core network as depicted in FIG. 1.

Figure 5:
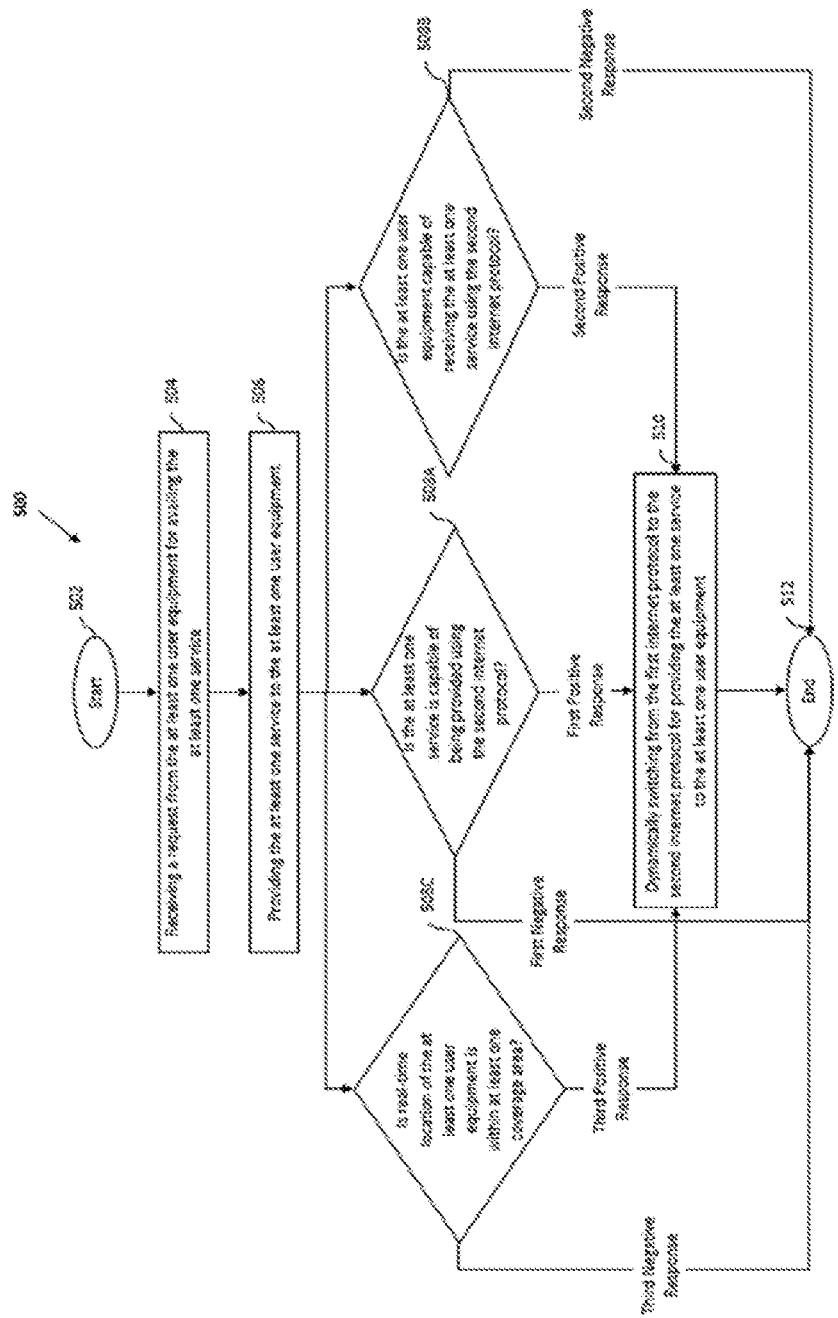
FIG. 5 illustrates an exemplary method flow diagram [500] for dynamically switching from a first internet protocol to a second internet protocol for providing service to user equipment [118], in accordance with an embodiment of the present invention.

As illustrated in FIG. 5, the present invention illustrates an exemplary method flow diagram [500] for dynamically switching from the first internet protocol to the second internet protocol for providing the at least one service to the at least one user equipment [118], in accordance with an embodiment of the present invention, wherein the method being performed by the core network or the at least one user equipment [118]. The method flow initiates at step 502.

Step 504 includes receiving the request from the at least one user equipment [118] for availing the at least one service. In an embodiment, such request is transmitted from the at least one user equipment [118] when a user of the at least one user equipment [118] accesses the one or more applications [118A] to access the at least one service.

Step 506 includes providing the at least one service to the at least one user equipment [118], wherein the at least one service is provided using the first internet protocol. The at least one service is provided to the at least one user equipment [118] pursuant to receiving the request from the at least one user equipment [118].

Step 508A includes determining if the at least one service is capable of being provided using the second internet protocol and generating the first positive response and the first negative response. Further, the first positive response is generated in an event the at least one service is capable of being provided using the second internet protocol and the first negative response is generated in an event the at least one service is incapable of being provided using the second internet protocol. If the first positive response is generated, the method flow diagram jumps to Step 510 and if the first negative response is generated, the method flow diagram jumps to Step 512.

Step 508B includes determining if the at least one user equipment [118] is capable of receiving the at least one service using the second internet protocol and generating the second positive response and the second negative response. Further, the second positive response is generated in an event the at least one user equipment [118] is capable of receiving the at least one service using the second internet protocol and the second negative response is generated in an event the at least one user equipment [118] is incapable of receiving the at least one service using the second internet protocol. If the second positive response is generated, the method flow diagram jumps to Step 510 and if the second negative response is generated, the method flow diagram jumps to Step 512.

Step 508C includes determining if the real-time location of the at least one user equipment [118] is within the MBSFN coverage area and generating the third positive response and the third negative response. Further, the third positive response is generated in an event the real-time location of the at least one user equipment [118] is within the MBSFN coverage area and the third negative response is generated in an event the real-time location of the at least one user equipment [118] is out of the MBSFN coverage area. If the third positive response is generated, the method flow diagram jumps to Step 510 and if the third negative response is generated, the method flow diagram jumps to Step 512. Further, the MBSFN coverage area belongs to an area that provides the at least one service using the second internet protocol.

Step 510 includes dynamically switching from the first internet protocol to the second internet protocol for providing the at least one service to the at least one user equipment [118] based on at least one of the first positive response, the second positive response and the third positive response. Thereafter, providing the at least one service to the at least one user equipment using the second internet protocol.

Then, the method [500] may end at step 512.

The present invention also compasses the dynamically switching from the second internet protocol to the first internet protocol for providing the at least one service to the at least one user equipment [118] based on at least one of the first negative response, the second negative response and the third negative response. Such dynamic switching is performed by the core network and/or the one or more applications [118A].

The present invention further encompasses an encoder which feeds a MPEG-DASH video delivery to the eBMSC [104] for LTE broadcast and the eBMSC [104] also delivers the MPEG-DASH stream to the content provider [102] (single encoder maintains the 2 seconds chunks which is frame align). The following are the broadcast video profile and the unicast video profile:

Broadcast Video Profile—
Chunks duration: 2 seconds
Constant Bit Rate CBR
800 Kbps of video delivery
64 Kbps of Audio Delivery
Unicast Video Profile—
Chunks duration: 2 seconds
Adaptive Video Delivery
200, 400 & 800 Kbps of video delivery
64 Kbps of Audio Delivery The present invention further encompasses additional steps which are performed in the background by the one or more applications [118A] or the core/LTE network for dynamically switching from the first internet protocol to the second internet protocol for providing the at least one service to the at least one user equipment [118]. Such steps include: providing the at least one service to the at least one user equipment [118] by the one or more applications [118A] stored in the at least one equipment [118], encoding the at least one service (aired on a TV channel) as per defined bit rate, packaging live feed of the at least one service as per MPEG-DASH, pulling the MPEG-DASH MPD file by the eBMSC [104] from a MPEG-DASH server, broadcasting by the eBMSC [104] the at least one service (i.e. content) via the eMBMS gateway [108] and the one or more E-node B [114A, 114B], and initializing the eMBMS middleware [118C] by the one or more applications [118A] stored in the at least one equipment [118] for receiving the at least one service using the second internet protocol.

In an embodiment, the logic to receive the at least one service may be indicated through an application level policy and as an example such an application level policy may be an access network discovery and selection function (ANDSF) entity. In yet another embodiment, bootstrap information may also contain policies on when to switch back to first internet protocol or when to switch to second internet protocol channel for the at least one service. In another one embodiment, the one or more E-node B [114A, 114B] may trigger an eMBMS counting procedure to know the number of user equipments listening to eMBMS broadcast. In one embodiment such a counting procedure may include a distinction between user equipments listening to eMBMS channels over unicast channels. This may be used to dynamically switch-off eMBMS channel when not necessary in one of the radio access points.

The units, interfaces, modules, and components depicted in the figures and described herein may be present in the form of a hardware, a software and a combination thereof. Connection/s shown between these units/components/modules/interfaces in the exemplary system architecture [100] and the at least one user equipment [118], may interact with each other through various logical links and/or physical links. Further, the units/components/modules/interfaces may be connected in other possible ways.

Though a limited number of the units/components/modules/interfaces, the exemplary system architecture [100] and the at least one user equipment [118], have been shown in the figures; however, it will be appreciated by those skilled in the art that the exemplary system architecture [100] and the at least one user equipment [118], of the present invention encompasses any number and varied types of the entities/elements such units/components/modules/interfaces, the exemplary system architecture [100] and the at least one user equipment [118].

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

We claim:
1. A method for dynamically switching from a first internet protocol to a second internet protocol for providing at least one service to at least one user equipment, the method comprising:
  receiving a request from the at least one user equipment for availing the at least one service;
  providing the at least one service to the at least one user equipment, wherein the at least one service is provided using the first internet protocol;
  determining if the at least one service is capable of being provided using the second internet protocol;
  generating a first positive response and a first negative response, wherein
  the first positive response is generated in an event the at least one service is capable of being provided using the second internet protocol, and
  the first negative response is generated in an event the at least one service is incapable of being provided using the second internet protocol;
  generating a second positive response and a second negative response, wherein
  the second positive response is generated in an event the at least one user equipment is capable of receiving the at least one service using the second internet protocol, and
  the second negative response is generated in an event the at least one user equipment is incapable of receiving the at least one service using the second internet protocol;

generating a third positive response and a third negative response, wherein
the third positive response is generated in an event a real-time location of the at least one user equipment is within at least one coverage area, and
the third negative response is generated in an event the real-time location of the at least one user equipment is out of the at least one coverage area; and
dynamically switching from the first internet protocol to the second internet protocol for providing the at least one service to the at least one user equipment based on at least one of the first positive response, the second positive response and the third positive response.

2. The method as claimed in claim 1, further comprising dynamically switching from the second internet protocol to the first internet protocol for providing the at least one service to the at least one user equipment based on at least one of the first negative response, the second negative response and the third negative response.

3. The method as claimed in claim 1, wherein the at least one service corresponds to an evolved multimedia broadcast multicast service.

4. The method as claimed in claim 1, wherein the at least one service includes at least one of a video streaming, a live video streaming, a live audio streaming, virtual reality (VR) streaming, a data streaming and an audio streaming.

5. The method as claimed in claim 1, wherein the first internet protocol corresponds to unicast internet protocol.

6. The method as claimed in claim 1, wherein the second internet protocol corresponds to broadcast internet protocol.

7. The method as claimed in claim 1, wherein the at least one coverage area belongs to an area providing the second internet protocol.

8. A system for dynamically switching from a first internet protocol to a second internet protocol for providing at least one service to at least one user equipment, the system comprising:
a transceiver configured to receive a request from the at least one user equipment for availing the at least one service;
a service provider module configured to provide the at least one service to the at least one user equipment, wherein the at least one service is provided using the first internet protocol;
a processing unit configured to determine if the at least one service is capable of being provided using the second internet protocol;
a response generator module configured to:
generate a first positive response and a first negative response, wherein
the first positive response is generated in an event the at least one service is capable of being provided using the second internet protocol, and
the first negative response is generated in an event the at least one service is incapable of being provided using the second internet protocol;
generate a second positive response and a second negative response, wherein
the second positive response is generated in an event the at least one user equipment is capable of receiving the at least one service using the second internet protocol, and
the second negative response is generated in an event the at least one user equipment is incapable of receiving the at least one service using the second internet protocol; and
generate a third positive response and a third negative response, wherein
the third positive response is generated in an event a real-time location of the at least one user equipment is within at least one coverage area, and
the third negative response is generated in an event the real-time location of the at least one user equipment is out of the at least one coverage area; and
wherein the processing module further configured to dynamically switch from the first internet protocol to the second internet protocol for providing the at least one service to the at least one user equipment based on at least one of the first positive response, the second positive response and the third positive response.

* * * * *